United States Patent
Imanishi et al.

(10) Patent No.: US 6,744,380 B2
(45) Date of Patent: Jun. 1, 2004

(54) APPARATUS FOR MONITORING AREA ADJACENT TO VEHICLE

(75) Inventors: Masayuki Imanishi, Okazaki (JP); Tetsuya Nakamura, Chiryu (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 50 days.

(21) Appl. No.: 10/228,041

(22) Filed: Aug. 27, 2002

(65) Prior Publication Data

US 2003/0069695 A1 Apr. 10, 2003

(30) Foreign Application Priority Data

Oct. 10, 2001 (JP) ........................................ 2001-312686

(51) Int. Cl.$^7$ ................................................. G08G 1/17
(52) U.S. Cl. .................. 340/937; 340/903; 340/904; 340/435; 340/436; 340/437; 701/301; 701/300
(58) Field of Search ................................ 340/937, 903, 340/904, 435, 436, 437; 701/300, 301

(56) References Cited

U.S. PATENT DOCUMENTS 5,369,590 A   11/1994 Karasudani ................. 701/300
6,226,571 B1 * 5/2001 Kai .............................. 701/1
6,411,896 B1 * 6/2002 Shuman et al. ............ 701/209
6,629,036 B2 * 9/2003 Hirao ......................... 701/301

FOREIGN PATENT DOCUMENTS

| JP | 5-296767 | 11/1993 |
| JP | 9-223235 | 8/1997 |
| JP | 11-48885 | 2/1999 |

* cited by examiner

*Primary Examiner*—Daryl Pope
(74) *Attorney, Agent, or Firm*—Posz & Bethards, PLC

(57) ABSTRACT

An apparatus for monitoring an area adjacent to a subject vehicle includes an image taking device for taking an image of an area at and around a place to which the subject vehicle is directed. A predicting device operates for predicting a region to which the subject vehicle will travel. The predicted region has a left-hand boundary and a right-hand boundary. A setting device operates for setting a detection area near at least one of the left-hand boundary and the right-hand boundary of the predicted region. The detection area extends along a direction of travel of the subject vehicle. A deciding device operates for deciding whether or not a three-dimensional object exists in the detection area in response to the image taken by the image taking device. The three-dimensional object is, for example, a cut-in vehicle with respect to the subject vehicle.

15 Claims, 6 Drawing Sheets

IN THE ABSENCE OF STEERING SENSOR SIGNAL

IN THE PRESENCE OF STEERING SENSOR SIGNAL

AT FIRST DETECTION

CUT-IN VEHICLE IS DETECTED AND ALARM IS GENERATED, AND SECOND ALARM IS NOT GENERATED DURING 3 SECONDS THEREAFTER

DUPLICATE ALARM PREVENTING FUNCTION

CUT-IN VEHICLE IS DETECTED, AND, ALARM IS NOT GENERATED SINCE IT IS IN UNALARMING ZONE

APPARATUS FOR MONITORING AREA ADJACENT TO VEHICLE

BACKGROUND OF THE INVENTION

1. Field of the Invention

This invention relates to an apparatus for monitoring an area adjacent to a vehicle such as an area in front of the vehicle. In addition, this invention relates to a computer program for monitoring an area adjacent to a vehicle.

2. Description of the Related Art

A known on-vehicle apparatus takes an image of conditions of a road in front of a subject vehicle, and analyzes the image to detect an obstacle to the subject vehicle. Typical operation of the known on-vehicle apparatus is as follows. A preceding vehicle with respect to the subject vehicle is detected. The positional relation between the preceding vehicle and the subject vehicle is detected. On the basis of the detected positional relation, a decision is made as to whether or not the preceding vehicle is an obstacle to the subject vehicle. When it is decided that the preceding vehicle is an obstacle, the speed of the subject vehicle is controlled or an alarm is given. To detect a preceding vehicle and accurately measure the position thereof, the known on-vehicle apparatus implements complicated image and signal processing procedures.

U.S. Pat. No. 5,369,590 corresponding to Japanese patent application publication number 5-296767 discloses an inter-vehicle distance detecting device which operates as follows. The device displays the images of preceding vehicles, sets a tracking window surrounding one of the images and tracks it, calculates the distance from the driving vehicle to the preceding vehicle, and sets a plurality of shadow windows which are not displayed and which are different from the tracking window, at predetermined positions in the image taken by one of top and bottom image sensors. Distances from the driving vehicle to objects caught by the respective shadow windows are detected from the deviation between top and bottom corresponding image signals, and a symmetry determining means reads image signals in an arbitrary domain in the shadow windows and surroundings and determines horizontal symmetry. A cut-in vehicle or lane change of the one of the preceding vehicles which is image-tracked by predicting movements thereof in front of the driving vehicle is detected based on information about the distances from the driving vehicle to the objects in the shadow windows, an output of the symmetry determining means, and information provided by a calculation based on the preceding vehicle tracked by the tracking window.

Japanese patent application publication number 9-223235 discloses a system mounted on a subject vehicle. The system includes a camera for taking an image of a road in front of the subject vehicle. On the basis of the road image, detection is given of the boundary between the lane where the subject vehicle is moving and a lane next to the lane of the subject vehicle. A vehicle moving in the next lane and preceding the subject vehicle is recognized in response to the road image. Moving conditions of the next-lane preceding vehicle are detected. The detected lane boundary and the detected moving conditions are used in detecting the inclination angle of the moving direction of the next-lane preceding vehicle relative to the lane boundary. The system decides whether or not the next-lane preceding vehicle will enter the lane of the subject vehicle on the basis of the detected inclination angle.

Japanese patent application publication number 11-48885 discloses an on-vehicle distance measurement apparatus including two juxtaposed cameras for taking images of an area in front of a subject vehicle. The cameras have image sensors onto which the images are focused by optical systems, respectively. The images on the image sensors are compared by electrical image processing to get a condition where they best correlate with each other. Under the best-correlation condition, shifts of a same object in the images from the optical axes are detected. The distance from the subject vehicle to the object is measured by triangulation responsive to the detected shifts. A plurality of objects such as vehicles preceding the subject vehicle can be detected. In the case where first and second preceding vehicles are detected and the first preceding vehicle is handled as a distance-measured object, a decision is made as to whether or not the second preceding vehicle has entered the region between the subject vehicle and the first preceding vehicle. Also, a decision is made as to whether or not the first preceding vehicle has moved from the region between the subject vehicle and the second preceding vehicle to a lane different from the lane of the subject vehicle. When it is decided that the second preceding vehicle has entered the region between the subject vehicle and the first preceding vehicle, the distance-measured object is changed from the first preceding vehicle to the second preceding vehicle. When it is decided that the first preceding vehicle has moved from the region between the subject vehicle and the second preceding vehicle, the distance-measured object is changed from the first preceding vehicle to the second preceding vehicle.

SUMMARY OF THE INVENTION

It is a first object of this invention to provide a simple apparatus for monitoring an area adjacent to a vehicle.

It is a second object of this invention to provide a simple computer program for monitoring an area adjacent to a vehicle.

A first aspect of this invention provides an apparatus for monitoring an area adjacent to a subject vehicle. The apparatus comprises image taking means for taking an image of an area at and around a place to which the subject vehicle is directed; predicting means for predicting a region to which the subject vehicle will travel, the predicted region having a left-hand boundary and a right-hand boundary; setting means for setting a detection area near at least one of the left-hand boundary and the right-hand boundary of the predicted region, the detection area extending along a direction of travel of the subject vehicle; and deciding means for deciding whether or not a three-dimensional object exists in the detection area in response to the image taken by the image taking means.

A second aspect of this invention is based on the first aspect thereof, and provides an apparatus wherein the detection area comprises small areas having a prescribed width, and the small areas are arranged along the direction of travel of the subject vehicle, and are partially overlapped to enhance a resolution relating to distance from the subject vehicle.

A third aspect of this invention is based on the first aspect thereof, and provides an apparatus wherein the predicting means comprises means for setting the predicted region in response to a width of the subject vehicle.

A fourth aspect of this invention is based on the first aspect thereof, and provides an apparatus wherein the predicting means comprises turn condition detecting means for detecting a turn condition of the subject vehicle, and means for setting the predicted region in response to the turn condition detected by the turn condition detecting means.

A fifth aspect of this invention is based on the first aspect thereof, and provides an apparatus wherein the predicting means comprises lane mark detecting means for detecting lane marks on a road along which the subject vehicle is traveling, and means for setting the predicted region in response to the lane marks detected by the lane mark detecting means.

A sixth aspect of this invention is based on the first aspect thereof, and provides an apparatus wherein the setting means comprises vehicle speed detecting means for detecting a speed of the subject vehicle, and means for setting the detection area in response to the speed detected by the vehicle speed detecting means.

A seventh aspect of this invention is based on the first aspect thereof, and provides an apparatus wherein the image taking means comprises a plurality of cameras spaced at a prescribed interval, and the deciding means comprises means for detecting a parallax between portions of images taken by the cameras which correspond to a same object in the detection area, means for measuring a distance to the same object from the detected parallax, means for determining whether or not the measured distance to the same object is shorter than a distance to a corresponding road surface, and means for deciding that a three-dimensional object exists in the detection area when it is determined that the measured distance to the same object is shorter than the distance to the corresponding road surface.

An eighth aspect of this invention is based on the first aspect thereof, and provides an apparatus wherein the detection area is at a prescribed distance or shorter from the subject vehicle for detection of a cut-in vehicle with respect to the subject vehicle.

A ninth aspect of this invention is based on the first aspect thereof, and provides an apparatus wherein the predicting means comprises means for setting the predicted region in response to a width of the subject vehicle, wherein the setting means comprises means for setting detection areas near the left-hand boundary and the right-hand boundary of the predicted region, and the detection areas extend along the direction of travel of the subject vehicle, and wherein the deciding means comprises means for deciding whether or not the subject vehicle can pass through a narrowed road zone in response to portions of the image which correspond to the detection areas.

A tenth aspect of this invention is based on the first aspect thereof, and provides an apparatus wherein the predicting means comprises means for setting the predicted region in response to a width of the subject vehicle, wherein the setting means comprises means for setting detection areas near the left-hand boundary and the right-hand boundary of the predicted region, and the detection areas extend along the direction of travel of the subject vehicle, and wherein the deciding means comprises means for deciding whether or not the subject vehicle can be successfully parked into a limited space in response to portions of the image which correspond to the detection areas.

An eleventh aspect of this invention is based on the ninth aspect thereof, and provides an apparatus wherein the predicting means comprises means for setting the predicted region in response to a length of the subject vehicle.

A twelfth aspect of this invention is based on the first aspect thereof, and provides an apparatus further comprising notifying means for notifying a result of the deciding by the deciding means.

A thirteenth aspect of this invention is based on the eighth aspect thereof, and provides an apparatus further comprising an on-vehicle system for implementing at least one of (1) inter-vehicle control of the subject vehicle and (2) an inter-vehicle warning process for a preceding vehicle with respect to the subject vehicle; warning means for generating an alarm for a cut-in vehicle in response to a result of the deciding by the deciding means; and preventing means for preventing the warning means from generating a second alarm during a prescribed time interval from a moment of generation of a first alarm.

A fourteenth aspect of this invention is based on the thirteenth aspect thereof, and provides an apparatus wherein the preventing means comprises means for, in cases where a cut-in vehicle is handled as a preceding vehicle by the on-vehicle system, preventing the warning means from generating an alarm.

A fifteenth aspect of this invention provides a computer program for operating a computer as the apparatus of the first aspect of this invention.

DETAILED DESCRIPTION OF THE INVENTION

First Embodiment

Figure 1:
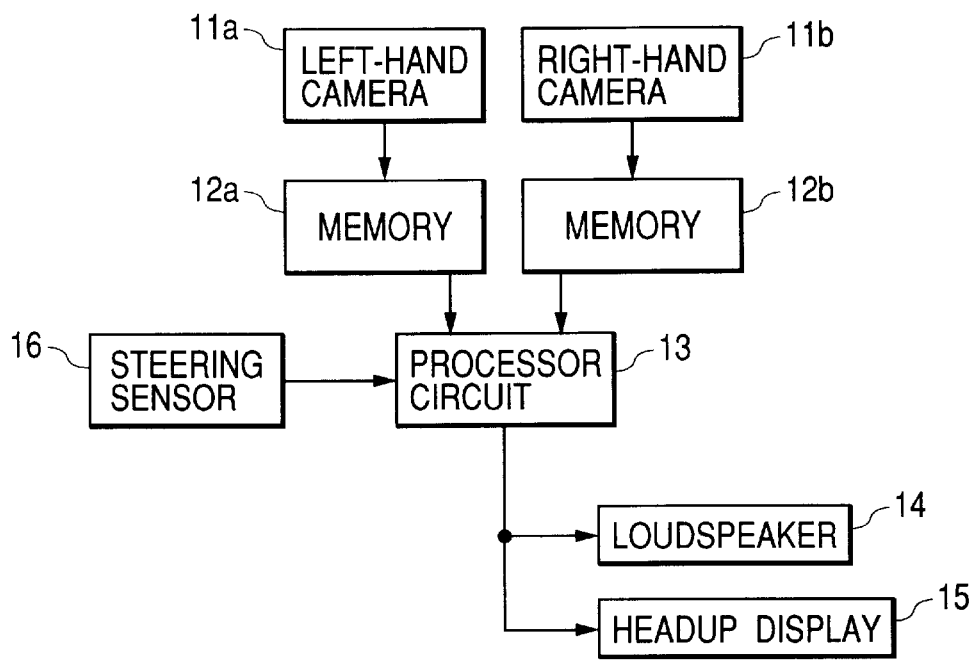
FIG. 1 is a block diagram of an on-vehicle apparatus for monitoring an area adjacent to a vehicle according to a first embodiment of this invention.

FIG. 1 shows an on-vehicle apparatus for monitoring an area adjacent to a vehicle (a subject vehicle) according to a first embodiment of this invention. The apparatus of FIG. 1 includes a left-hand camera 11a, a right-hand camera 11b, memories 12a and 12b, and a processor circuit 13. The cameras 11a and 11b operate as image taking means, and face forward with respect to the subject vehicle. The left-hand camera 11a periodically converts an image of a scene into a corresponding image signal. The left-hand camera 11a outputs the image signal to the memory 12a. The memory 12a stores the output signal of the left-hand camera 11a. The right-hand camera 11b periodically converts an image of a scene into a corresponding image signal. The right-hand camera 11b outputs the image signal to the memory 12b. The memory 12b stores the output signal of the right-hand camera 11b. The processor circuit 13 is connected with the memories 12a and 12b. A loudspeaker 14 and a headup display 14 are connected to the processor circuit 13. Also, a steering sensor 16 provided in the subject vehicle is connected with the processor circuit 13. The steering sensor 16 detects the steering angle of the subject vehicle. The steering sensor 16 outputs a signal representative of the detected steering angle to the processor circuit 13.

The left-hand camera 11a and the right-hand camera 11b are mounted on the subject vehicle. The left-hand camera 11a and the right-hand camera 11b are spaced at a prescribed interval in a horizontal widthwise direction of the subject vehicle. The cameras 11a and 11b have optical axes parallel to each other, and the base length therebetween is parallel to the road surface on which the subject vehicle is placed. Each of the cameras 11a and 11b includes a lens and an image sensor. The image sensor is of, for example, a CCD type. Each of the cameras 11a and 11b periodically takes an image of a scene in front of the subject vehicle, and converts the image into a corresponding image signal. Each of the cameras 11a and 11b outputs the image signal.

The processor circuit 13 includes a microcomputer having a combination of an input/output port, a processing unit, a ROM, and a RAM. The processor circuit 13 operates in accordance with a control program stored in the ROM or the RAM.

Alternatively, the control program may be stored in a recording medium such as a floppy disk, a magneto-optical disk, a CD-ROM, a DVD-ROM, or a hard disk. In this case, the processor circuit 13 is connected with a drive for the recording medium, and the control program is downloaded into the microcomputer of the processor circuit 13 through the drive.

The processor circuit 13 reads out the image signals from the memories 12a and 12b. The processor circuit 13 detects a vehicle entering or cutting in a region in front of the subject vehicle on the basis of the image signals and the steering-angle signal. Such a vehicle is referred to as a cut-in vehicle. When detecting a cut-in vehicle, the processor circuit 13 controls the loudspeaker 14 to generate an alarm sound and also controls the headup display 15 to indicate prescribed information.

Figure 2:
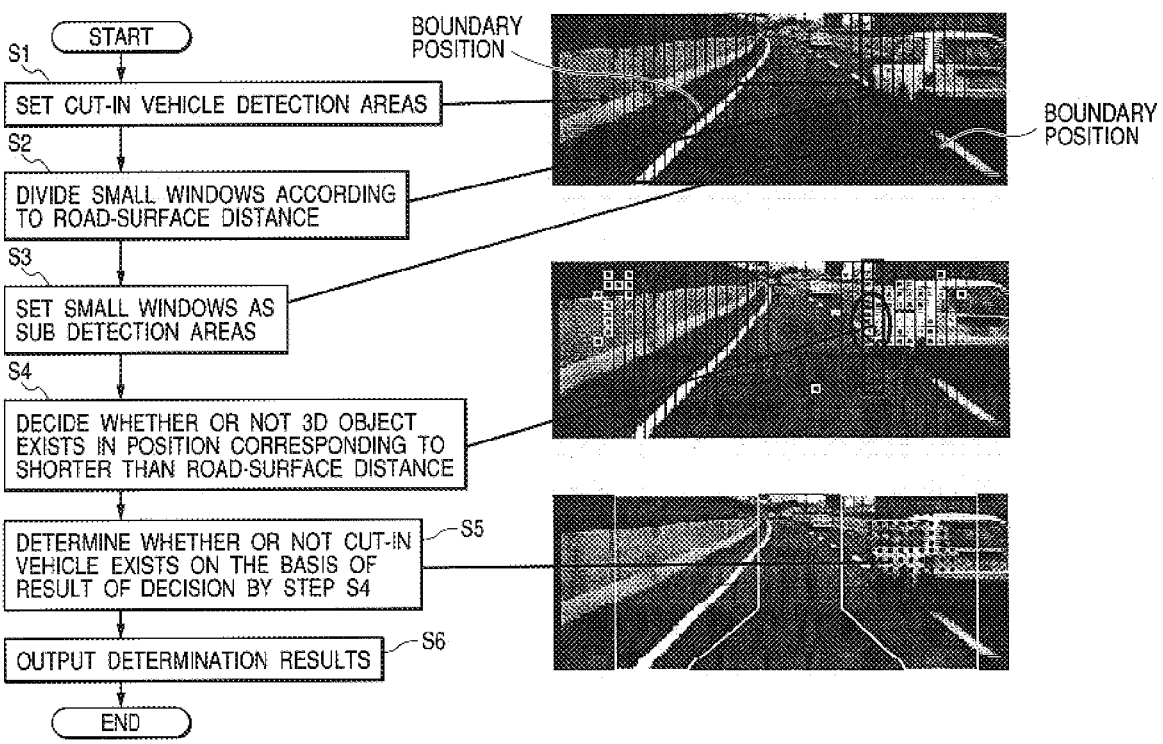
FIG. 2 is a view having a flowchart of a segment of a control program for a processor circuit in FIG. 1, and pictures processed by the processor circuit.

FIG. 2 is a flowchart of a segment of the control program for the processor circuit 13 which relates to detection of a cut-in vehicle. The program segment in FIG. 2 is iterated at a prescribed period.

Figure 3:
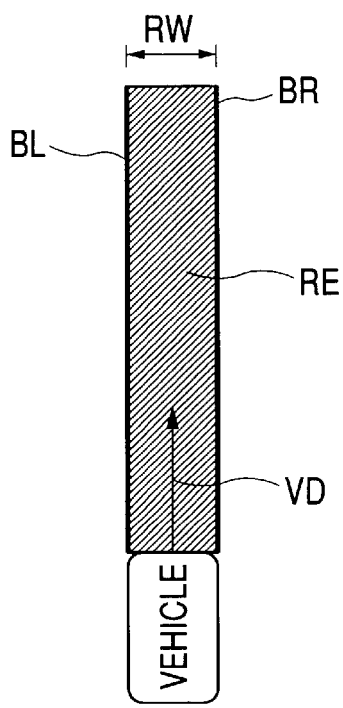
FIG. 3 is a diagram of a predicted region to which a subject vehicle will travel.

As shown in FIG. 2, a first step S1 of the program segment sets left-hand and right-hand cut-in vehicle detection areas. Specifically, the step S1 derives the current steering angle from the output signal of the steering sensor 16. The step S1 predicts a region RE to which the subject vehicle will travel on the basis of the current steering angle. In more detail, the step S1 derives the current direction VD of the travel of the subject vehicle from the current steering angle. The current vehicle travel direction VD is defined as starting from the center of the front of the subject vehicle. The step S1 sets a region width RW to the sum of a predetermined vehicle width W and a prescribed value "α". The predetermined vehicle width W is equal to the width of the subject vehicle. The step S1 virtually sets a predicted region RE in front of the subject vehicle and centered at the current vehicle travel direction VD as shown in FIG. 3. Furthermore, the predicted region RE has a width equal to the region width RW.

Preferably, the predicted region RE has a predetermined length measured from the front edge of the subject vehicle. The step S1 reads out the image signals from the memories 12a and 12b. The step S1 converts the positions of the left-hand and right-hand boundaries (edges) BL and BR of the predicted region RE into corresponding on-image positions, that is, positions on frames or images represented by the image signals.

The step S1 virtually sets the cut-in vehicle detection areas while using the on-image positions of the predicted-region boundaries BL and BR as references. Specifically, the step S1 places small areas or small rectangular windows on each of frames (images) represented by the image signals which are arranged along the current vehicle travel direction VD and near the on-image positions of the predicted-region boundaries BL and BR. The small rectangular windows are separated into a group of ones near the on-image position of the left-hand predicted-region boundary BL, and a group of ones near the on-image position of the right-hand predicted-region boundary BR. Each of the small rectangular windows has horizontal sides, and vertical sides longer than the horizontal sides. In the case where the field angle of the cameras 11a and 11b is equal to 45 degrees and the resolution thereof is equal to 352 dots, each of the small rectangular windows has a width (a horizontal dimension) of 16 dots and a height (a vertical dimension) of 100 dots to 144 dots. Here, "dot" means "pixel". The small rectangular windows correspond to different distances from the subject vehicle. The small-rectangular-window height varies from 144 dots to 100 dots as the corresponding distance from the subject vehicle increases from the minimum to the maximum. Basically, neighboring ones of the small rectangular windows half overlap each other. The small rectangular windows compose the cut-in vehicle detection areas. Accordingly, the cut-in vehicle detection areas extend along the current vehicle travel direction VD.

The cut-in vehicle detection areas are adjacent to the on-image positions of the predicted-region boundaries BL and BR. Preferably, the cut-in vehicle detection areas are located inside the on-image positions of the predicted-region boundaries BL and BR. In this case, non-cut-in vehicles are more reliably prevented from being erroneously detected as cut-in vehicles. The cut-in vehicle detection areas may be located outside the on-image positions of the predicted-region boundaries BL and BR. As the cut-in vehicle detection areas are outer, a cut-in vehicle can be detected at an earlier stage.

For each of the small rectangular windows, a step S2 following the step S1 calculates the distance from the subject vehicle to a road surface whose image is in the present small rectangular window. The road-surface distance calculation is based on the on-frame position of the present small rectangular window and also specified parameters of the cameras 11a and 11b. The step S2 divides or sorts the small rectangular windows according to the road-surface distance from the subject vehicle.

A step S3 subsequent to the step S2 sets the sorted small rectangular windows as sub detection areas for different values of the road-surface distance.

For each of the sub detection areas, a step S4 following the step S3 processes corresponding portions of the image signals to decide whether or not a three-dimensional object exists in a position corresponding to shorter than the road-surface distance related to the present sub detection area.

For each of the sub detection areas, a step S5 subsequent to the step S4 determines whether or not a cut-in vehicle exists on the basis of the result of the decision by the step S4. Specifically, the step 5 determines that a cut-in vehicle exists when the step S4 decides that a three-dimensional object exists. The step 5 determines that a cut-in vehicle does not exist when the step S4 decides that a three-dimensional object does not exist.

A step S6 following the step S5 outputs information representing the results of the determination by the step S5, that is, information representing the results of detection of whether or not a cut-in vehicle exists. After the step S6, the current execution cycle of the program segment ends.

Parallax-based distance measurement is contained in the decision by the step S4 as to whether or not a three-dimensional object exists. The parallax-based distance measurement will be described below in detail. Same partial pictures corresponding to an actual object (for example, a cut-in vehicle or a road surface) are determined in images represented by the image signals generated by the left-hand and right-hand cameras 11a and 11b. The parallax between the determined same partial images is calculated. The distance from the subject vehicle to the actual object is measured on the basis of the calculated parallax. Specifically, the image signals generated by the cameras 11a and 11b include first luminance information and second luminance information representing images, respectively. The first luminance information and the second luminance information relate to different viewpoints (different camera positions), respectively. Regarding same partial pictures corresponding to an actual object, the positional deviation (the parallax) between the first luminance information and the second luminance information is calculated. The distance from the subject vehicle to the actual object is measured on the basis of the calculated parallax, the interval between the viewpoints (the interval between the cameras 11a and 11b), the field angle of the cameras 11a and 11b, and the number of pieces (for example, 1-pixel-corresponding pieces) of the first luminance information and the second luminance information.

Figure 4:
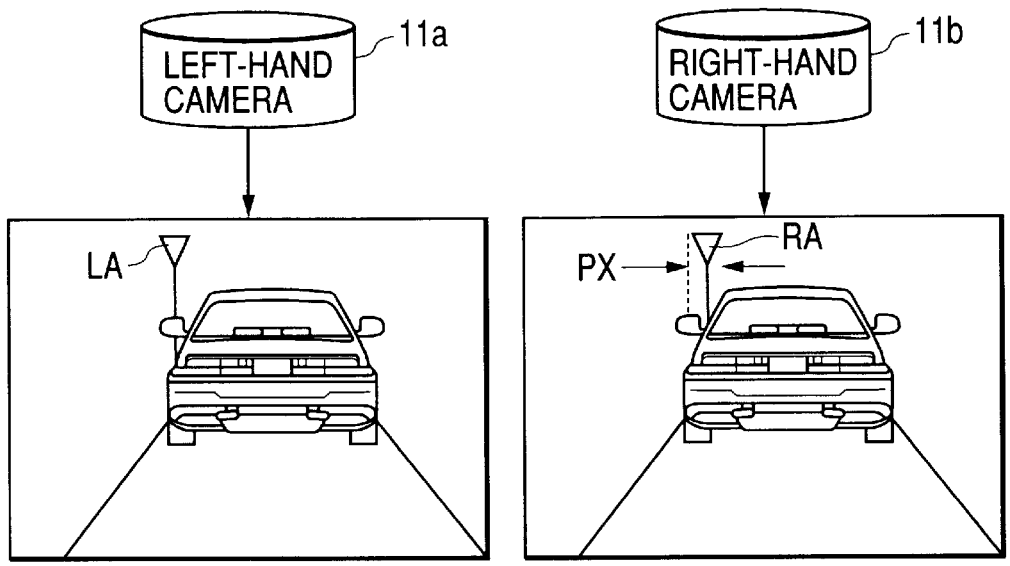
FIG. 4 is a diagram of cameras, and images represented by the output signals of the cameras.

With reference to FIG. 4, a partial picture LA in an image represented by the output signal (the image signal) of the left-hand camera 11a and a partial picture RA in an image represented by the output signal (the image signal) of the right-hand camera 11b correspond in common to an actual object. There is a parallax PX between the partial pictures LA and RA.

Figure 5:
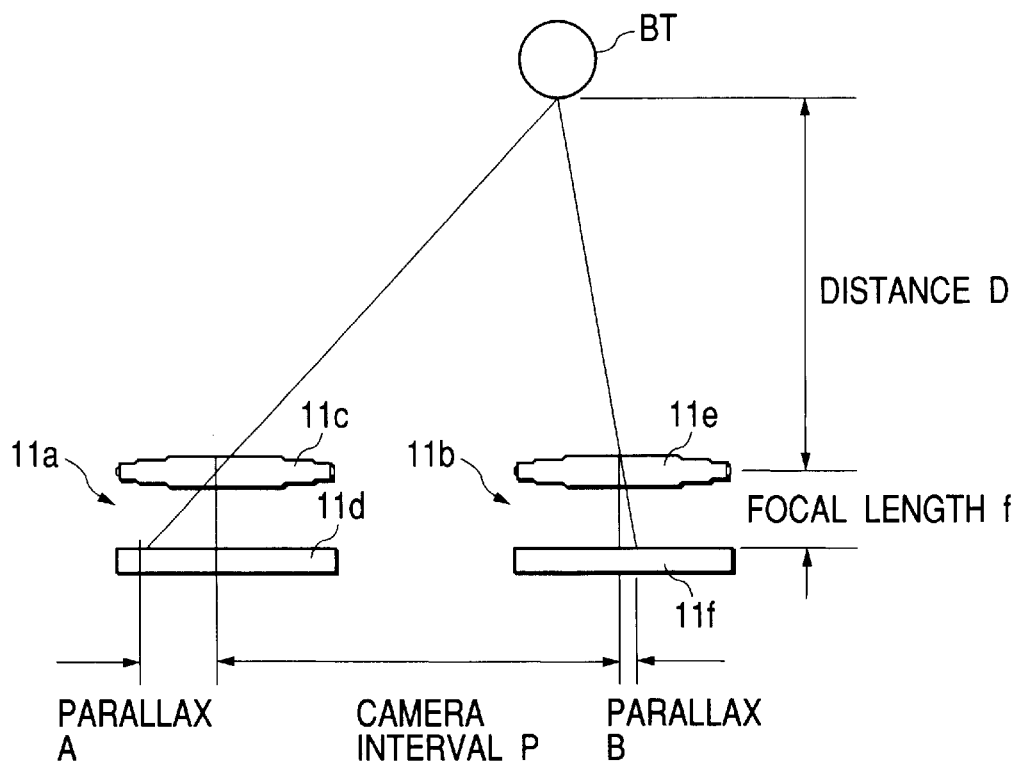
FIG. 5 is a diagram of the cameras, and an object whose images are taken by the cameras.

As shown in FIG. 5, the left-hand camera 11a includes a lens 11c and an image sensor 11d. The lens 11c is in front of the image sensor 11d. The distance between the lens 11c and the image sensor 11d is equal to the focal length "f" related to the lens 11c. An image of an object BT in front of the subject vehicle is focused onto the image sensor 11d via the lens 11c. The position of the image of the object BT on the image sensor 11d is at a horizontal distance "A" from the optical axis of the lens 11c. The distance "A" corresponds to a first partial parallax. The right-hand camera 11b includes a lens 11e and an image sensor 11f. The lens 11e is in front of the image sensor 11f. The distance between the lens 11e and the image sensor 11f is equal to the focal length "f" related to the lens 11e. An image of the object BT is focused onto the image sensor 11f via the lens 11e. The position of the image of the object BT on the image sensor 11f is at a horizontal distance "B" from the optical axis of the lens 11e. The distance "B" corresponds to a second partial parallax. The forward-direction distance (the longitudinal distance) "D" from the lenses 11c and 11e to the object BT is given by the following equation.

$$D = P \cdot f / (A+B) \quad (1)$$

where "P" denotes the pitch between the optical axes of the lenses 11c and 11e (that is, the interval between the cameras 11a and 11b); "f" denotes the focal length related to the lenses 11c and 11e; and "A" and "B" denote the above-indicated distances (the first and second partial parallaxes).

Since the camera interval "P" and the focal length "f" are known, the distance "D" to the object BT can be determined according to the previously-indicated equation (1) provided that the value "A+B" is decided. The value "A+B" is equal to the sum of the first and second partial parallaxes "A" and "B" which corresponds to the parallax PX. The decision of the value (the parallax) "A+B" is implemented as follows. Regarding partial pictures corresponding to the actual object BT, the degree of the matching between the first luminance information generated by the left-hand camera 11a and the second luminance information generated by the right-hand camera 11b is calculated while the first luminance information and the second luminance information are relatively shifted little by little. The quantity of the shift is determined when the calculated degree of the matching peaks. The determined shift quantity is used as corresponding to the value "A+B". In other words, the value "A+B" is decided in accordance with the determined shift quantity.

The distance from the subject vehicle to a road surface whose image is in each of the small rectangular windows is calculated from the on-frame position of the small rectangular window and also the setting values of specified parameters of the cameras 11a and 11b (the step S2). The specified parameters are the field angle, the resolution, the focal length, and the depression angle. Regarding each of the small rectangular windows, in the absence of a detectable three-dimensional object from the region between the subject vehicle and a specified preceding point corresponding to the calculated road-surface distance, the parallax-based measured distance is equal to the calculated road-surface distance. On the other hand, in the presence of a detectable three-dimensional object in the region between the subject vehicle and the specified preceding point, the parallax-based measured distance is shorter than the calculated road-surface distance. In view of these facts, when the parallax-based measured distance is shorter than the calculated road-surface distance, the step S4 decides that a three-dimensional object exists in a position corresponding to shorter than the road-surface distance related to the present small rectangular window (the present sub detection area). Otherwise, the step S4 decides that a three-dimensional object does not exist.

A more detailed description will be given below of the decision by the step S4 as to whether or not a three-dimensional object exists. A right-hand sub detection area (a right-hand small rectangular window) relating to a road-surface distance of 15 m is taken as an example. This sub detection area is denoted by the thick lines in the pictures in FIG. 2. The distance to an object whose image is in the sub detection area of interest is calculated in the previously-mentioned parallax-based method. Specifically, an image portion in the sub detection area of interest in one of the images represented by the output signals of the cameras 11a and 11b is used as a reference, and a decision is made as to which portion in the other image the reference image portion corresponds to. In more detail, all sub detection areas (all small rectangular windows) in the images represented by the output signals of the cameras 11a and 11b are divided into squares having sides equal in length to half the width of one sub detection area. The squares are in a fashion of a mesh. For example, each of the squares has a vertical dimension of 8 pixels (dots) and a horizontal dimension of 8 pixels (dots). Squares composing the sub detection area of interest in one of the images represented by the output signals of the cameras 11*a* and 11*b* are used as references. For each of the reference squares, the following procedure is implemented. The degree of the correlation between the reference square and a square in the other image is computed while the latter square is shifted unit by unit (for example, dot by dot) in a direction causing a parallax "A+B". The highest correction degree is decided, and also the parallax "A+B" corresponding to the highest correlation degree is decided. The distance "D" to an object whose partial image is in the reference square is calculated from the decided parallax "A+B" corresponding to the highest correlation degree. Accordingly, calculated distances "D" to an object are obtained for the reference squares, respectively. The calculated distances "D" are compared with 15 m (the road-surface distance relating to the sub detection area of interest) to decide whether or not each of the distances "D" is smaller than 15 m. The distances "D" smaller than 15 m are counted. A decision is made as to whether or not the total number of the distances "D" smaller than 15 m is less than a prescribed threshold number. When the total number of the distances "D" smaller than 15 m is equal to or greater than the prescribed threshold number, it is decided that a three-dimensional object exists in the sub detection area of interest. Otherwise, it is decided that a three-dimensional object does not exist.

For the sub detection area of interest, the squares may be sequentially subjected to the distance calculation and the distance comparison in the order from the square at about a vertical-direction center of the sub detection area toward the square at an edge thereof. In this case, the processing for the decision as to whether or not a three-dimensional object exists in the sub detection area may be terminated when the number of the distances "D" smaller than the related road-surface distance reaches the prescribed threshold number.

The above-mentioned decision as to whether or not a three-dimensional object exists is implemented for each of the sub detection areas (the small rectangular windows). It may be immediately determined that a cut-in vehicle exists when a three-dimensional object is decided to be in one sub detection area. Alternatively, it may be determined that a cut-in vehicle exists only when three-dimensional objects are decided to be in neighboring sub detection areas. In this case, a wrong decision about a cut-in vehicle can be prevented.

It may be determined that a cut-in vehicle exists when a three-dimensional object continues to be decided to be in a sub detection area for at least two successive frames. It may be determined that a cut-in vehicle exists when a three-dimensional object continues to be decided to be in at least one among neighboring and corresponding sub detection areas for two or more successive frames.

In the case where it is determined that a cut-in vehicle exists, the processor circuit 13 controls the loudspeaker 14 to generate an alarm sound. The driver of the subject vehicle is enabled by the alarm sound to become aware of the cut-in vehicle. When it is determined that a cut-in vehicle exists, the processor circuit 13 controls the headup display 15 to indicate the predicted-region boundary positions and the cut-in vehicle position.

As previously mentioned, the apparatus of FIG. 1 predicts a region RE to which the subject vehicle will travel. The apparatus virtually sets left-hand and right-hand cut-in vehicle detection areas near the boundaries BL and BR of the predicted region RE. Only for the left-hand and right-hand cut-in vehicle detection areas, a decision is made as to whether or not a three-dimensional object exists. On the basis of the results of the decision, the apparatus determines whether or not a cut-in vehicle exists. Therefore, detection of a cut-in vehicle does not require an inspection of the whole of the images represented by the output signals of the cameras 11*a* and 11*b*. Since the left-hand and right-hand cut-in vehicle detection areas are near the boundaries BL and BR of the predicted region RE, it is unnecessary to inspect image portions remote from the boundaries BL and BR. A decision as to whether or not a three-dimensional object exists is not executed for a central part of the predicted region RE. From the standpoint of cut-in vehicle detection reliability, it is sufficient to execute a decision about the existence of a three-dimensional object only for the left-hand and right-hand cut-in vehicle detection areas near the boundaries BL and BR of the predicted region RE. Accordingly, the processing for the detection of a cut-in vehicle is relatively simple.

As previously mentioned, the steering sensor 16 detects the steering angle of the subject vehicle. The steering sensor 16 informs the processor circuit 13 of the detected steering angle. The processor circuit 13 predicts a region RE to which the subject vehicle will travel on the basis of the detected steering angle. Therefore, the predicted region RE depends on the condition of a turn of the subject vehicle. This design prevents the occurrence of wrong detection of a cut-in vehicle which might be caused during a turn of the subject vehicle.

Figure 6:
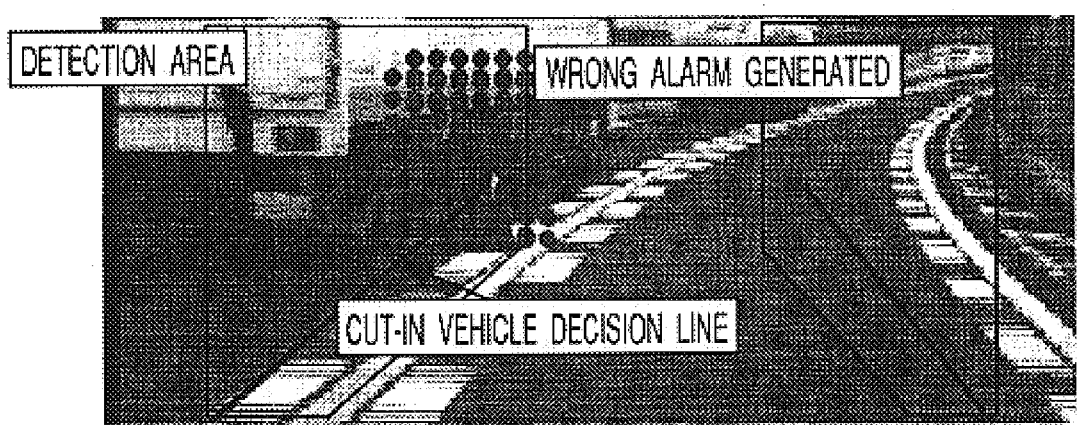
FIG. 6 is a picture having cut-in vehicle detection areas set in a conceivable comparative apparatus which does not use the output signal of a steering sensor.
Figure 7:
FIG. 7 is a picture having cut-in vehicle detection areas set in the apparatus of FIG. 1 which uses the output signal of a steering sensor.

FIG. 6 shows cut-in vehicle detection areas set in a conceivable comparative apparatus which does not use the output signal of a steering sensor 16. On the other hand, FIG. 7 shows cut-in vehicle detection areas set in the apparatus of FIG. 1 which uses the output signal of the steering sensor 16. With reference to FIG. 6, the subject vehicle is moving in a rightward lane of a 2-lane right-handed curved road, and cut-in vehicle detection areas are set in places having portions considerably deviating from the traveling direction of the subject vehicle. Thus, in this case, a vehicle normally moving in the leftward lane is erroneously recognized to be a cut-in vehicle, and a wrong alarm is given. With reference to FIG. 7, the subject vehicle is moving in a rightward lane of a 2-lane right-handed curved road, and cut-in vehicle detection areas are set in places consistent with the traveling direction of the subject vehicle. Thus, in this case, it is possible to prevent a vehicle normally moving in the leftward lane from being erroneously recognized to be a cut-in vehicle.

As previously mentioned, neighboring ones of the sub detection areas (the small rectangular windows) half overlap each other. This design provides a high resolution of a measured distance from the subject vehicle. Specifically, the overlap fashion causes smaller differences in distance between the sub detection areas than those provided in an assumed design where sub detection areas do not overlap. The smaller differences in distance between the sub detection areas result in a higher resolution of a measured distance from the subject vehicle.

Second Embodiment

A second embodiment of this invention is similar to the first embodiment thereof except that a yaw rate sensor replaces the steering angle sensor 16. The yaw rate sensor detects the yaw rate of the subject vehicle. The yaw rate sensor informs the processor circuit 13 of the detected yaw rate as the condition of a turn of the subject vehicle. The processor circuit 13 predicts a region RE to which the subject vehicle will travel on the basis of the detected yaw rate.

Third Embodiment

Figure 8:
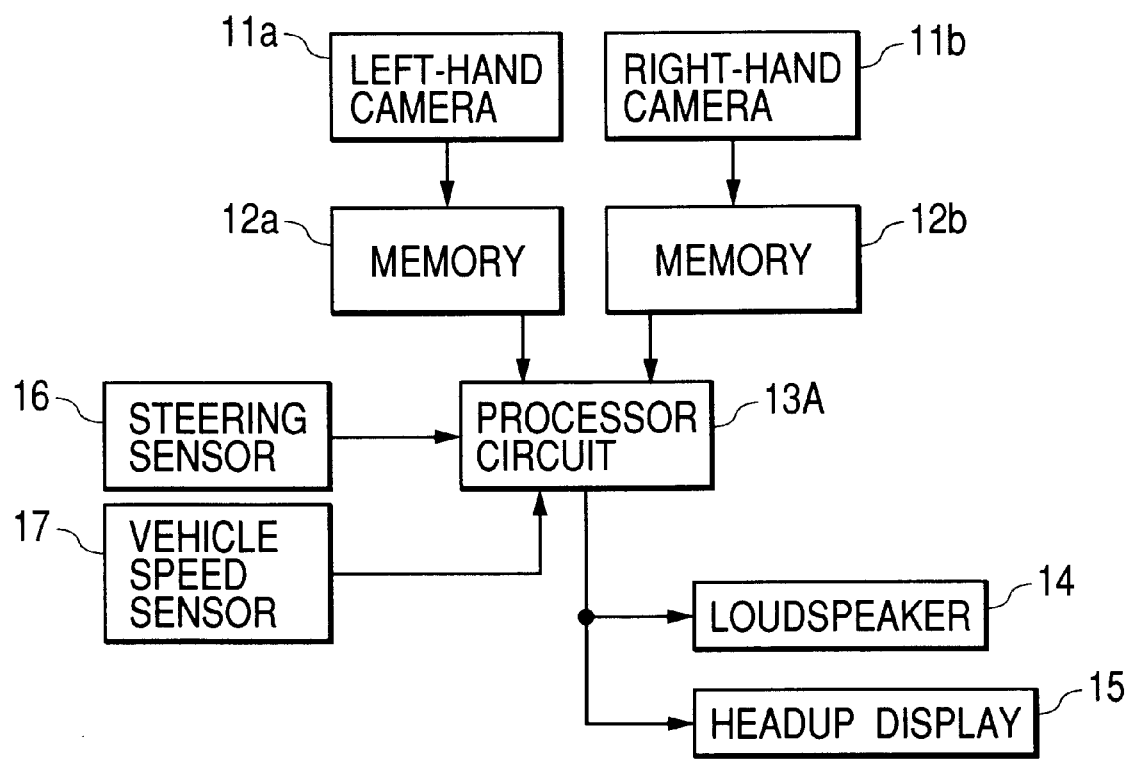
FIG. 8 is a block diagram of an on-vehicle apparatus for monitoring an area adjacent to a vehicle according to a third embodiment of this invention.

FIG. 8 shows an on-vehicle apparatus for monitoring an area adjacent to a vehicle (a subject vehicle) according to a third embodiment of this invention. The apparatus of FIG. 8 is similar to the apparatus of FIG. 1 except for design changes indicated hereafter.

The apparatus of FIG. 8 includes a processor circuit 13A instead of the processor circuit 13 (see FIG. 1). The apparatus of FIG. 8 further includes a vehicle speed sensor 17 connected with the processor circuit 13A. The vehicle speed sensor 17 detects the speed of the subject vehicle. The vehicle speed sensor 17 informs the processor circuit 13A of the detected vehicle speed. The processor circuit 13A sets the region width RW (the width of the predicted region RE) to the sum of the predetermined vehicle width W and a value "D" which is increased as the detected vehicle speed rises. Accordingly, the width of the predicted region RE is increased as the detected vehicle speed rises. The increased width of the predicted region RE causes an earlier timing of the detection of a cut-in vehicle.

Fourth Embodiment

A fourth embodiment of this invention is similar to the first embodiment thereof except for design changes indicated hereafter. According to the fourth embodiment of this invention, the processor circuit 13 processes the image signals to detect lane marks in the images represented by the image signals. The processor circuit 13 sets the region width RW (the width of the predicted region RE) in response to the detected lane marks.

Preferably, the positions of the detected lane marks are used as the positions of the predicted-region boundaries BL and BR. In general, the cut-in vehicle detection areas are located inside the detected lane marks. Alternatively, the cut-in vehicle detection areas may be located on the detected lane marks.

Fifth Embodiment

A fifth embodiment of this invention is similar to the first embodiment thereof except for design changes indicated hereafter. According to the fifth embodiment of this invention, the processor circuit 13 (see FIG. 1) virtually sets detection areas on the basis of the predetermined vehicle width W (the width of the subject vehicle). In the case where vehicles are parked along both sides of a road, the processor circuit 13 decides whether or not the subject vehicle can successfully pass through the region between the parked vehicles on the basis of the conditions of the detection areas. Preferably, the length of the subject vehicle is considered in the decision as to whether or not the subject vehicle can successfully pass through the region between the parked vehicles.

It is preferable to grasp the conditions of a zone corresponding to shorter distances from the subject vehicle, and to get information about how long the subject vehicle can successfully pass through the region between parked vehicles. In this case, it is preferable that the processor circuit 13 controls the headup display 15 to indicate how long the subject vehicle can successfully pass through the region between the parked vehicles.

Sixth Embodiment

A sixth embodiment of this invention is similar to the first embodiment thereof except for design changes indicated hereafter. According to the sixth embodiment of this invention, the processor circuit 13 (see FIG. 1) virtually sets detection areas on the basis of the predetermined vehicle width W (the width of the subject vehicle). In the case where vehicles are parked, the processor circuit 13 decides whether or not the subject vehicle can be successfully parked into the region between the parked vehicles on the basis of the conditions of the detection areas. Preferably, the length of the subject vehicle is considered in the decision as to whether or not the subject vehicle can be successfully parked into the region between the parked vehicles.

Preferably, the cameras 11a and 11b face backward with respect to the subject vehicle. In this case, it is possible to reliably decide whether or not the subject vehicle can be successfully parked into the region between the parked vehicles while being reversed.

There may be cameras facing forward and backward with respect to the subject vehicle.

Seventh Embodiment

A seventh embodiment of this invention is similar to the first embodiment thereof except for design changes indicated hereafter. According to the seventh embodiment of this invention, the speed of the subject vehicle is controlled when a cut-in vehicle is detected. Preferably, the subject vehicle is decelerated in response to the position of a detected cut-in vehicle and also the current speed of the subject vehicle.

Eighth Embodiment

An eighth embodiment of this invention is similar to the first embodiment thereof except for design changes indicated hereafter.

A cruise control system includes a laser radar for detecting a preceding vehicle with respect to a subject vehicle. When a preceding vehicle is detected, the cruise control system implements inter-vehicle control to enable the subject vehicle to automatically follow the preceding vehicle. In the absence of a detected preceding vehicle, the cruise control system maintains the speed of the subject vehicle at a setting value.

An inter-vehicle warning system includes a laser radar for measuring the distance between a subject vehicle and a vehicle preceding the subject vehicle. When the measured distance between the subject vehicle and the preceding vehicle becomes shorter than a reference value, the inter-vehicle warning system generates an alarm sound.

An on-vehicle apparatus in the eighth embodiment of this invention is used together with the cruise control system or the inter-vehicle warning system. Duplicate alarms are prevented from being given.

Figure 9:
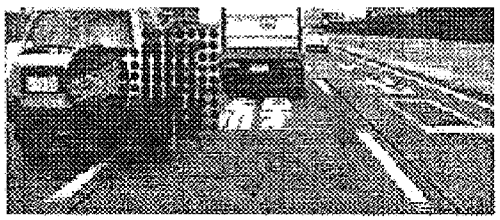
FIG. 9 is a view having a picture and a diagram of conditions where a first alarm is generated for a detected cut-in vehicle.
Figure 9:
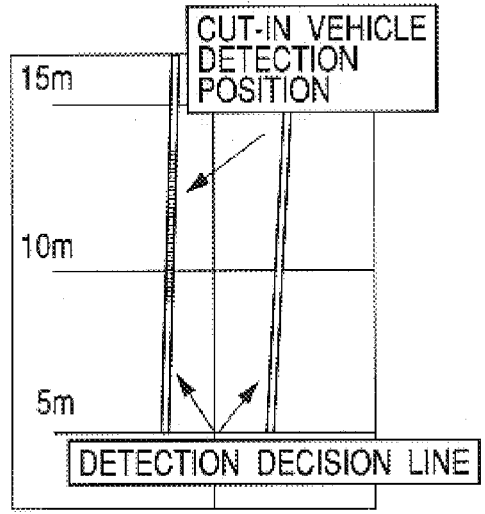

With reference to FIG. 9, a cut-in vehicle is detected so that an alarm is generated. During a prescribed time interval (for example, 3 seconds) from the moment of the generation of a first alarm for a detected cut-in vehicle, a second alarm remains prevented from being generated. In the case where the laser radar of the cruise control system or the inter-vehicle warning system detects a preceding vehicle during the prescribed time interval, a second alarm is not generated even when a cut-in vehicle is detected.

Figure 10:
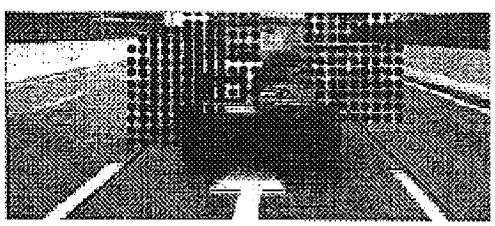
FIG. 10 is a view having a picture and a diagram of conditions where a second alarm is prevented from being generated for a detected cut-in vehicle.
Figure 10:
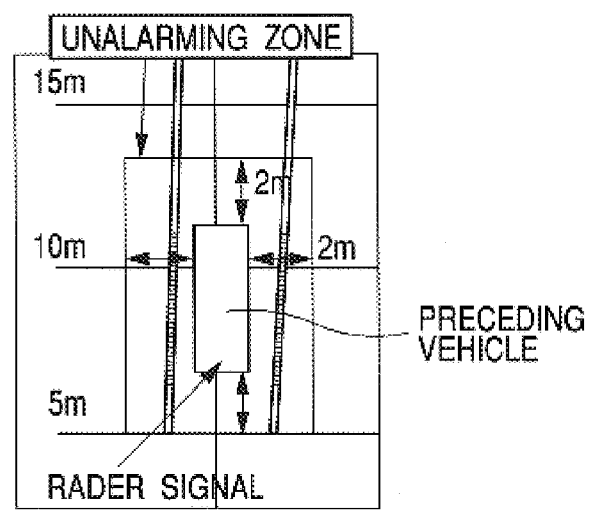

For example, as shown in FIG. 10, an unalarming zone is defined around a preceding vehicle detected by the laser radar of the cruise control system or the inter-vehicle warning system during the prescribed time interval. The unalarming zone is of a rectangular shape having left-hand, right-hand, front, and rear edges 2-m away from the left-hand, right-hand, front, and rear edges of the preceding vehicle respectively. During the prescribed time interval, a second alarm is not generated for a detected cut-in vehicle in the unalarming zone.

What is claimed is:

1. An apparatus for monitoring an area adjacent to a subject vehicle, comprising:

image taking means for taking an image of an area at and around a place to which the subject vehicle is directed;

predicting means for predicting a region to which the subject vehicle will travel, the predicted region having a left-hand boundary and a right-hand boundary;

setting means for setting a detection area near at least one of the left-hand boundary and the right-hand boundary of the predicted region, the detection area extending along a direction of travel of the subject vehicle; and deciding means for deciding whether or not a three-dimensional object exists in the detection area in response to the image taken by the image taking means.

2. An apparatus as recited in claim 1, wherein the detection area comprises small areas having a prescribed width, and the small areas are arranged along the direction of travel of the subject vehicle, and are partially overlapped to enhance a resolution relating to distance from the subject vehicle.

3. An apparatus as recited in claim 1, wherein the predicting means comprises means for setting the predicted region in response to a width of the subject vehicle.

4. An apparatus as recited in claim 1, wherein the predicting means comprises turn condition detecting means for detecting a turn condition of the subject vehicle, and means for setting the predicted region in response to the turn condition detected by the turn condition detecting means.

5. An apparatus as recited in claim 1, wherein the predicting means comprises lane mark detecting means for detecting lane marks on a road along which the subject vehicle is traveling, and means for setting the predicted region in response to the lane marks detected by the lane mark detecting means.

6. An apparatus as recited in claim 1, wherein the setting means comprises vehicle speed detecting means for detecting a speed of the subject vehicle, and means for setting the detection area in response to the speed detected by the vehicle speed detecting means.

7. An apparatus as recited in claim 1, wherein the image taking means comprises a plurality of cameras spaced at a prescribed interval, and the deciding means comprises means for detecting a parallax between portions of images taken by the cameras which correspond to a same object in the detection area, means for measuring a distance to the same object from the detected parallax, means for determining whether or not the measured distance to the same object is shorter than a distance to a corresponding road surface, and means for deciding that a three-dimensional object exists in the detection area when it is determined that the measured distance to the same object is shorter than the distance to the corresponding road surface.

8. An apparatus as recited in claim 1, wherein the detection area is at a prescribed distance or shorter from the subject vehicle for detection of a cut-in vehicle with respect to the subject vehicle.

9. An apparatus as recited in claim 1, wherein the predicting means comprises means for setting the predicted region in response to a width of the subject vehicle, wherein the setting means comprises means for setting detection areas near the left-hand boundary and the right-hand boundary of the predicted region, and the detection areas extend along the direction of travel of the subject vehicle, and wherein the deciding means comprises means for deciding whether or not the subject vehicle can pass through a narrowed road zone in response to portions of the image which correspond to the detection areas.

10. An apparatus as recited in claim 1, wherein the predicting means comprises means for setting the predicted region in response to a width of the subject vehicle, wherein the setting means comprises means for setting detection areas near the left-hand boundary and the right-hand boundary of the predicted region, and the detection areas extend along the direction of travel of the subject vehicle, and wherein the deciding means comprises means for deciding whether or not the subject vehicle can be successfully parked into a limited space in response to portions of the image which correspond to the detection areas.

11. An apparatus as recited in claim 9, wherein the predicting means comprises means for setting the predicted region in response to a length of the subject vehicle.

12. An apparatus as recited in claim 1, further comprising notifying means for notifying a result of the deciding by the deciding means.

13. An apparatus as recited in claim 8, further comprising:

an on-vehicle system for implementing at least one of (1) inter-vehicle control of the subject vehicle and (2) an inter-vehicle warning process for a preceding vehicle with respect to the subject vehicle;

warning means for generating an alarm for a cut-in vehicle in response to a result of the deciding by the deciding means; and preventing means for preventing the warning means from generating a second alarm during a prescribed time interval from a moment of generation of a first alarm.

14. An apparatus as recited in claim 13, wherein the preventing means comprises means for, in cases where a cut-in vehicle is handled as a preceding vehicle by the on-vehicle system, preventing the warning means from generating an alarm.

15. A computer program for operating a computer as the apparatus of claim 1.

* * * * *